United States Patent
Hay et al.

(10) Patent No.: US 12,392,658 B2
(45) Date of Patent: Aug. 19, 2025

(54) IN-MOTION LASER BEAM ANALYSIS AND ANALYSIS AT FIELD OF VIEW EXTREMITIES FOR HIGH-SPEED LASER MOTION SYSTEMS

(71) Applicant: Edison Welding Institute, Inc., Columbus, OH (US)

(72) Inventors: Jacob C. Hay, Columbus, OH (US); Ron Aman, Columbus, OH (US); Stanley L. Ream, Columbus, OH (US)

(*) Notice: Subject to any disclaimer, the term of this patent is extended or adjusted under 35 U.S.C. 154(b) by 0 days.

(21) Appl. No.: 18/144,411

(22) Filed: May 8, 2023

(65) Prior Publication Data

US 2024/0377248 A1    Nov. 14, 2024

Related U.S. Application Data

(60) Provisional application No. 63/339,645, filed on May 9, 2022.

(51) Int. Cl.
*G01J 1/42* (2006.01)
*B22F 10/28* (2021.01)
(Continued)

(52) U.S. Cl.
CPC ............ *G01J 1/4257* (2013.01); *B22F 10/28* (2021.01); *B22F 10/31* (2021.01); *B22F 12/90* (2021.01);
(Continued)

(58) Field of Classification Search
CPC ...... G01J 1/4257; G01J 1/4228; G01J 1/0271; G01J 1/0425; G01J 2001/0257;
(Continued)

(56) References Cited

U.S. PATENT DOCUMENTS 5,430,666 A * 7/1995 DeAngelis ............ B33Y 30/00
73/1.01
10,627,311 B2   4/2020 Ream et al.
(Continued)

OTHER PUBLICATIONS

International Search Report and Written Opinion for International Application No. PCT/US2023/021413 dated Dec. 11, 2023, 9 pages.
(Continued)

*Primary Examiner* — Dominic J Bologna

(57) ABSTRACT

A system for analyzing laser beam characteristics at field of view extremities in high-speed laser motion systems, wherein the high-speed laser motion systems comprise a laser that generates a non-stationary laser beam and a build platform positioned at a predetermined location relative to the non-stationary laser beam, comprising a known or pre-defined field of view of the laser, wherein the laser beam characteristics are known or determined at a center location of the field of view; and a plurality of pin-hole sensors mounted at the field of view extremities, wherein each pin-hole sensor measures the laser beam characteristics at the field of view extremities, and wherein differences between the laser beam characteristics at the center location and the laser beam characteristics at the field of view extremities are captured and accounted for in the high-speed laser motion system during processing.

16 Claims, 14 Drawing Sheets

(51) Int. Cl.

| | |
|---|---|
| *B22F 10/31* | (2021.01) |
| *B22F 12/20* | (2021.01) |
| *B22F 12/70* | (2021.01) |
| *B22F 12/90* | (2021.01) |
| *B23K 26/70* | (2014.01) |
| *B29C 64/268* | (2017.01) |
| *B29C 64/393* | (2017.01) |
| *B33Y 30/00* | (2015.01) |
| *B33Y 50/02* | (2015.01) |
| *G01J 1/02* | (2006.01) |
| *G01J 1/04* | (2006.01) |
| *G01K 17/00* | (2006.01) |

(52) U.S. Cl.
CPC .......... *B23K 26/702* (2015.10); *B23K 26/705* (2015.10); *B29C 64/268* (2017.08); *B29C 64/393* (2017.08); *B33Y 30/00* (2014.12); *B33Y 50/02* (2014.12); *G01J 1/4228* (2013.01); *G01K 17/003* (2013.01); *B22F 12/20* (2021.01); *B22F 12/70* (2021.01); *G01J 2001/0257* (2013.01); *G01J 1/0271* (2013.01); *G01J 1/0425* (2013.01)

(58) Field of Classification Search
CPC .......... B22F 10/28; B22F 10/31; B22F 12/90; B22F 12/20; B22F 12/70; B23K 26/702; B23K 26/705; B29C 64/268; B29C 64/393; B33Y 30/00; B33Y 50/02; G01K 17/003

See application file for complete search history.

(56) References Cited

U.S. PATENT DOCUMENTS

| | | | |
|---|---|---|---|
| 10,976,219 B2 | 4/2021 | Ream et al. | |
| 2014/0212317 A1 | 7/2014 | Garry | |
| 2017/0173736 A1* | 6/2017 | Gray | B33Y 30/00 |
| 2018/0281067 A1* | 10/2018 | Small | B33Y 50/02 |
| 2020/0209107 A1* | 7/2020 | Ream | G01J 1/0437 |

OTHER PUBLICATIONS

International Search Report and Written Opinion of the International Searching Authority for International Patent App. No. PCT/US2023/021413 dated as mailed on Aug. 11, 2023 (7 pages).

* cited by examiner

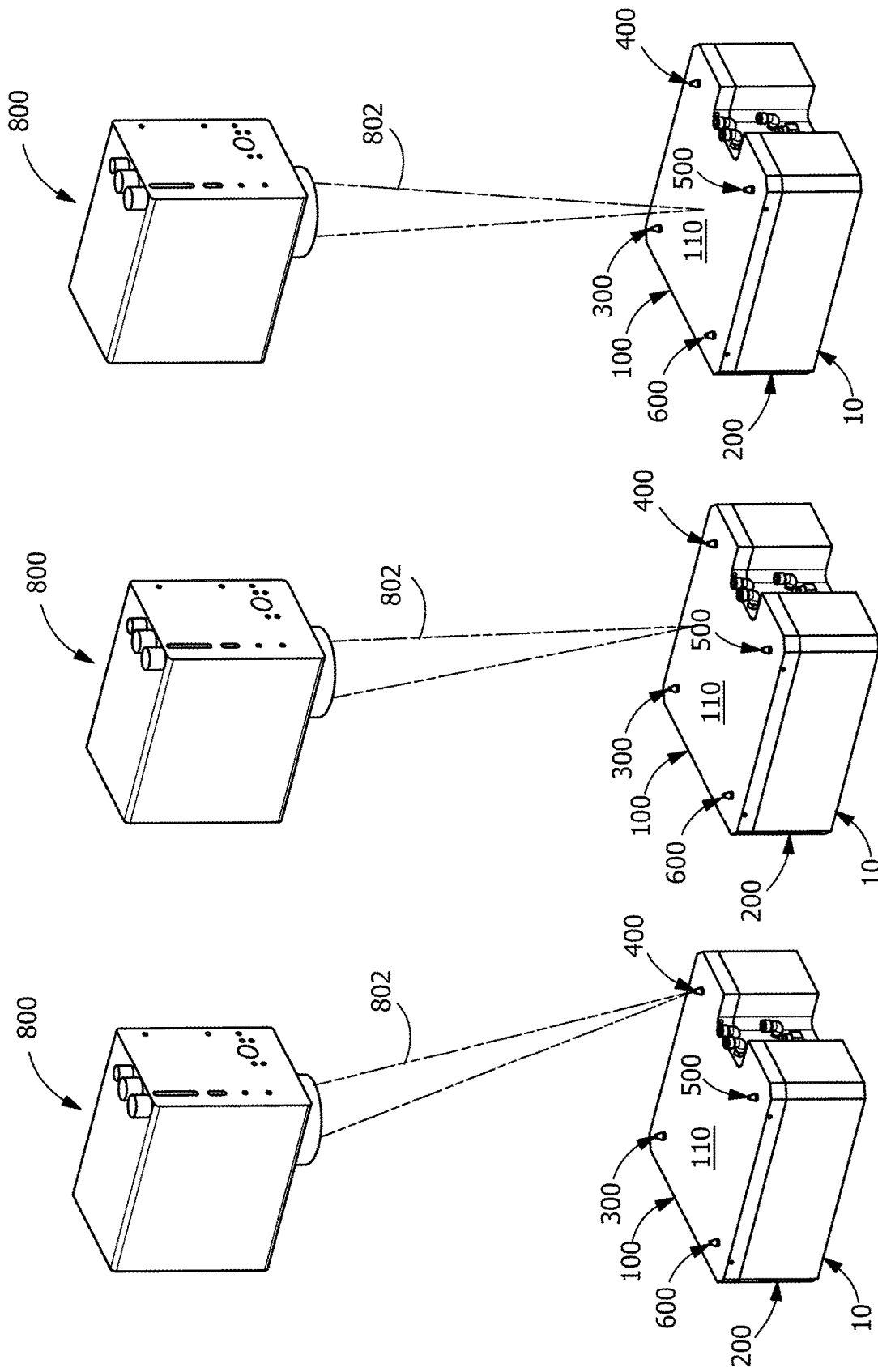

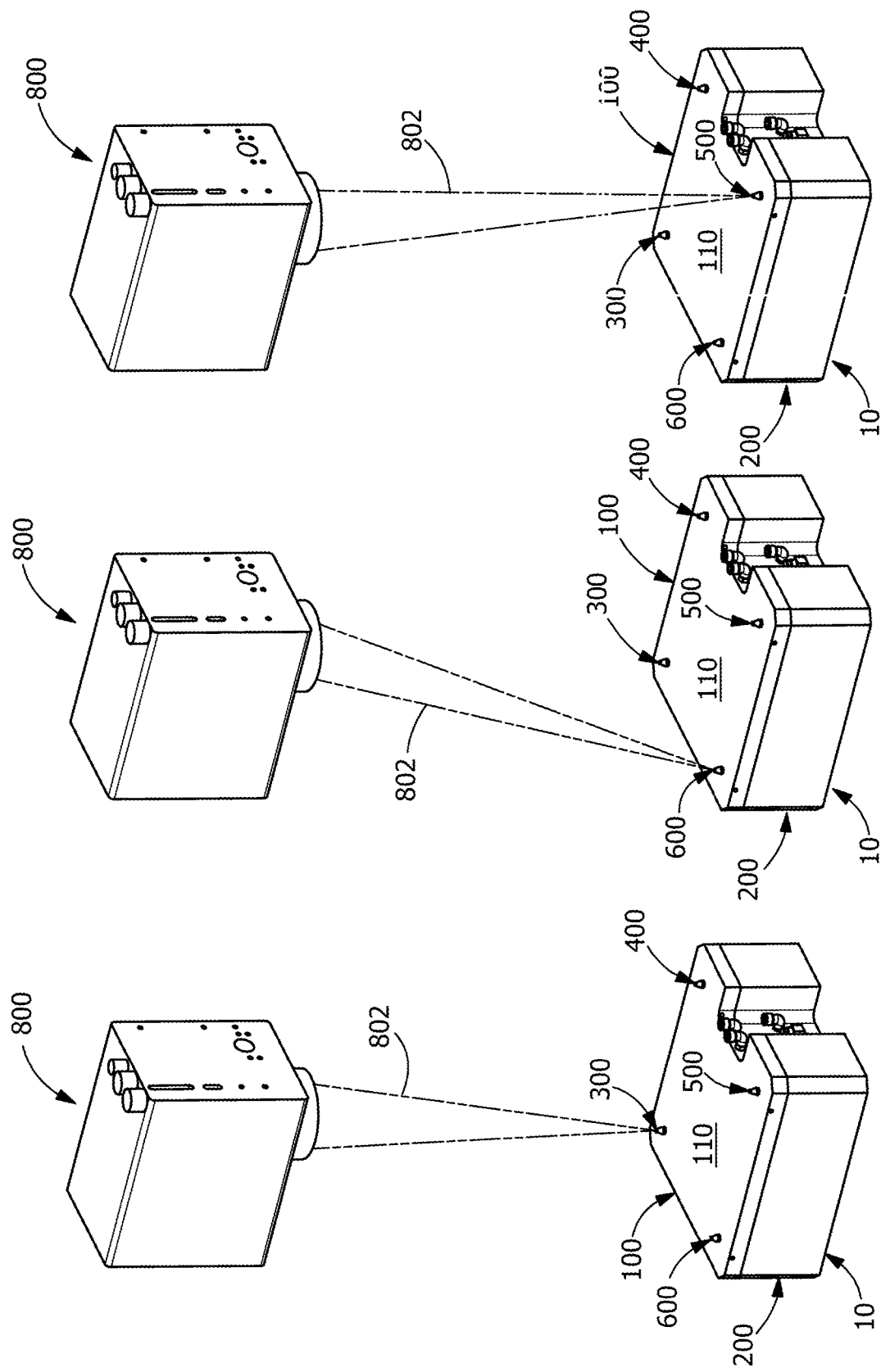

IN-MOTION LASER BEAM ANALYSIS AND ANALYSIS AT FIELD OF VIEW EXTREMITIES FOR HIGH-SPEED LASER MOTION SYSTEMS

CROSS-REFERENCE TO RELATED APPLICATIONS

This patent application claims the benefit of U.S. Provisional Patent Application Ser. No. 63/339,645 filed on May 9, 2022 and entitled "In-Motion Laser Beam Analysis at Filed of View Extremities for High-Speed Laser Systems" the disclosure of which is hereby incorporated by reference herein in its entirety and made part of the present U.S. utility patent application for all purposes.

BACKGROUND

The disclosed technology relates in general to laser systems having high speed motion capability and more specifically to systems, devices, and methods for characterizing, analyzing, and verifying proper functioning and performance of laser beam focal spots or images used in laser processing systems having high speed beam motion capability.

Laser processing typically includes using a laser beam to modify a work piece in a predetermined manner. Laser processing ranges from high-intensity laser ablation processes to significantly lower intensity processes such as heat treating, in which melting is avoided. Nearly all laser processing techniques involve forming the laser beam into a specific size and shape at a particular location or working distance from the laser system. Precise identification of the location where a laser system will create a focal spot or beam image having the desired characteristics is an important aspect of creating an efficient and optimized laser process.

Laser processing techniques include laser beam welding (LBW), which is a fusion welding process used to join materials in various configurations. Laser beam welding systems typically include a laser light source, a laser light delivery system, an optical arrangement for delivering laser light to a work piece, and frequently a motion system for moving either the laser beam or the work piece. LBW systems may include fiber-delivered beams or open beam paths, fixed optical systems or galvanometer systems that allow for rapid deflection of the laser beam. Mechanical motion systems may include high-speed systems or low-speed systems depending on intended application. For the LBW process, laser light is focused using optical arrangements that include a collimation lens or mirror that stops the divergence of the laser light from the light source and delivers the light to a focusing lens or mirror. The focusing lens or mirror then directs the high-intensity, focused laser light to the work piece that is to be welded. The high-intensity laser light is then used to melt the material of the work piece and fuse two or more parts or components together.

The use of laser processing systems, particularly LBW systems, in manufacturing has become common and such systems can be found in many manufacturing facilities worldwide. The functional success of all laser processing systems depends on predetermined, stable, and repeatable laser beam characteristics including focal spot shape, size, distribution, and location. Accordingly, there is an ongoing need for accurate, easy to use, and affordable systems, devices, and methods for analyzing the quality and dynamic accuracy of laser focal spots or images formed by laser processing systems having motion capability.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a system for analyzing laser beam characteristics at field of view extremities or other selected locations in high-speed laser motion systems, wherein the high-speed laser motion systems comprise a laser that generates a non-stationary laser beam and a build platform positioned at a predetermined location relative to the non-stationary laser beam, comprising a known or pre-defined field of view of the laser, wherein the laser beam characteristics are known or determined at a center location of the field of view; and a plurality of pin-hole sensors mounted at the field of view extremities such that each pin-hole sensor is positioned to receive the laser light generated by the non-stationary laser beam, wherein each pin-hole sensor measures the laser beam characteristics at the field of view extremities, wherein differences between the laser beam characteristics at the center location and the laser beam characteristics at the field of view extremities are captured and accounted for in the high-speed laser motion system during processing, and wherein any necessary adjustments in processing are made based on the differences.

The system may further comprise a portable testing apparatus, wherein the portable testing apparatus includes a support having an upper surface, wherein the upper surface is positioned parallel to and above the build platform of the high-speed laser motion systems, and wherein the upper surface is adapted to receive and absorb laser light generated by the laser beam. The plurality of pin-hole sensors are mounted at the field of view extremities in the support. The system may further comprise a fiber optic cable coupled to each pin-hole sensor, wherein each fiber optic cable has a proximal end at which the laser light is received through the pinhole sensor and a distal end to which the laser light is delivered. The system may further comprise a photodetector located at the distal end of each fiber optic cable, wherein the photodetector converts the laser light delivered to the photodetector into electrical voltage output signals based on intensity of the laser light received through each pin-hole sensor. The laser beam characteristics measured include spot size, shape, and irradiance within the spot size. A calibration plate is used to pre-define the field of view of the laser.

Another implementation of the disclosed technology provides a system for analyzing laser beam characteristics at field of view extremities or other selected locations in high-speed laser motion systems, wherein the high-speed laser motion systems comprise a laser that generates a laser beam and a build platform positioned at a predetermined location relative to the laser beam, comprising a portable testing apparatus, wherein the portable testing apparatus includes a support having an upper surface, wherein the upper surface is positioned parallel to and above the build platform of the high-speed laser motion systems, and wherein the upper surface is adapted to receive and absorb laser light generated by the laser beam; a known or pre-defined field of view of the laser, wherein the laser beam characteristics are known or determined at a center location of the field of view; and a plurality of pin-hole sensors mounted at the field of view extremities in the support such that each pin-hole sensor is positioned to receive the laser light generated by the laser beam, wherein each pin-hole sensor measures the laser beam characteristics at the field of view extremities, wherein differences between the laser beam characteristics at the center location and the laser beam characteristics at the field of view extremities are captured and accounted for in the high-speed laser motion system during processing, and wherein any necessary adjustments in processing are made based on the differences.

The system may further comprise a fiber optic cable coupled to each pin-hole sensor, wherein each fiber optic cable has a proximal end at which the laser light is received through the pinhole sensor and a distal end to which the laser light is delivered. The system may further comprise a photodetector located at the distal end of each fiber optic cable, wherein the photodetector converts the laser light delivered to the photodetector into electrical voltage output signals based on intensity of the laser light received through each pin-hole sensor. The laser beam characteristics measured include spot size, shape, and irradiance within the spot size. A calibration plate is used to pre-define the field of view of the laser.

Still another implementation of the disclosed technology provides a method for analyzing laser beam characteristics at field of view extremities or other selected locations in high-speed laser motion systems, wherein the high-speed laser motion systems comprise a laser that generates a non-stationary laser beam and a build platform positioned at a predetermined location relative to the non-stationary laser beam, comprising defining a field of view of the laser; mounting a plurality of pin-hole sensors at the field of view extremities such that each pin-hole sensor is positioned to receive the laser light generated by the non-stationary laser beam; through each pin-hole sensor, measuring the laser beam characteristics at the field of view extremities; capturing and accounting for differences between the laser beam characteristics at the field of view extremities and the laser beam characteristics at a known or determined center location of the field of view during processing; and making any necessary adjustments in processing based on the differences.

The method may further comprise coupling a fiber optic cable to each pin-hole sensor, wherein each fiber optic cable has a proximal end at which the laser light is received through the pinhole sensor and a distal end to which the laser light is delivered. The method may further comprise positioning a photodetector at the distal end of each fiber optic cable, wherein the photodetector converts the laser light delivered to the photodetector into electrical voltage output signals based on intensity of the laser light received through each pin-hole sensor. The laser beam characteristics measured include spot size, shape, and irradiance within the spot size. A calibration plate is used to define the field of view of the laser.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIG. 7A is an illustration of an example testing apparatus being used to analyze the characteristics of a non-stationary laser beam being generated by a laser source present in a laser powder bed fusion system, wherein the laser beam is shown contacting the testing apparatus at a first position;

FIG. 7B is an illustration of an example testing apparatus being used to analyze the characteristics of a non-stationary laser beam being generated by a laser source present in a laser powder bed fusion system, wherein the laser beam is shown contacting the testing apparatus at a second position;

FIG. 7C is an illustration of an example testing apparatus being used to analyze the characteristics of a non-stationary laser beam being generated by a laser source present in a laser powder bed fusion system, wherein the laser beam is shown contacting the testing apparatus at a third position;

FIG. 7D is an illustration of an example testing apparatus being used to analyze the characteristics of a non-stationary laser beam being generated by a laser source present in a laser powder bed fusion system, wherein the laser beam is shown contacting the testing apparatus at a fourth position;

FIG. 7E is an illustration of an example testing apparatus being used to analyze the characteristics of a non-stationary laser beam being generated by a laser source present in a laser powder bed fusion system, wherein the laser beam is shown contacting the testing apparatus at a fifth position;

FIG. 7F is an illustration of an example testing apparatus being used to analyze the characteristics of a non-stationary laser beam being generated by a laser source present in a laser powder bed fusion system, wherein the laser beam is shown contacting the testing apparatus at a sixth position;

FIGS. 9A-9B depict an example implementation of the disclosed system, wherein FIG. 9A depicts analyzing laser beam characteristics at a center location of the field of view of a laser, wherein FIG. 9B depicts analyzing laser beam characteristics at a pin-hole sensor located away from the center of the field of view of the laser, and wherein

DETAILED DESCRIPTION

Figure 1:
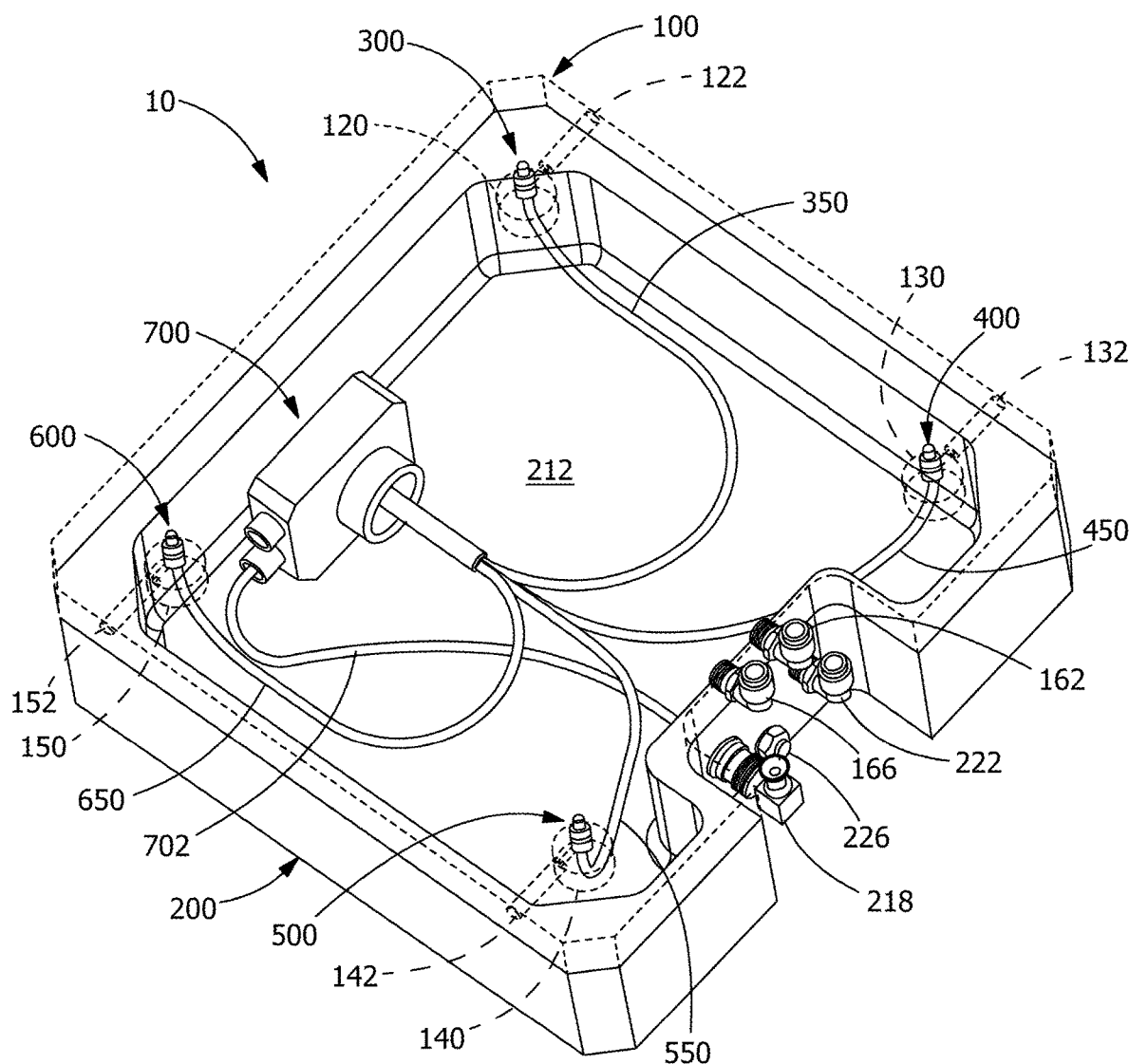
FIG. 1 is a perspective view of an example testing apparatus for use with laser powder bed fusion systems, wherein the calibration plate/support component is shown in broken lines.
Figure 2:
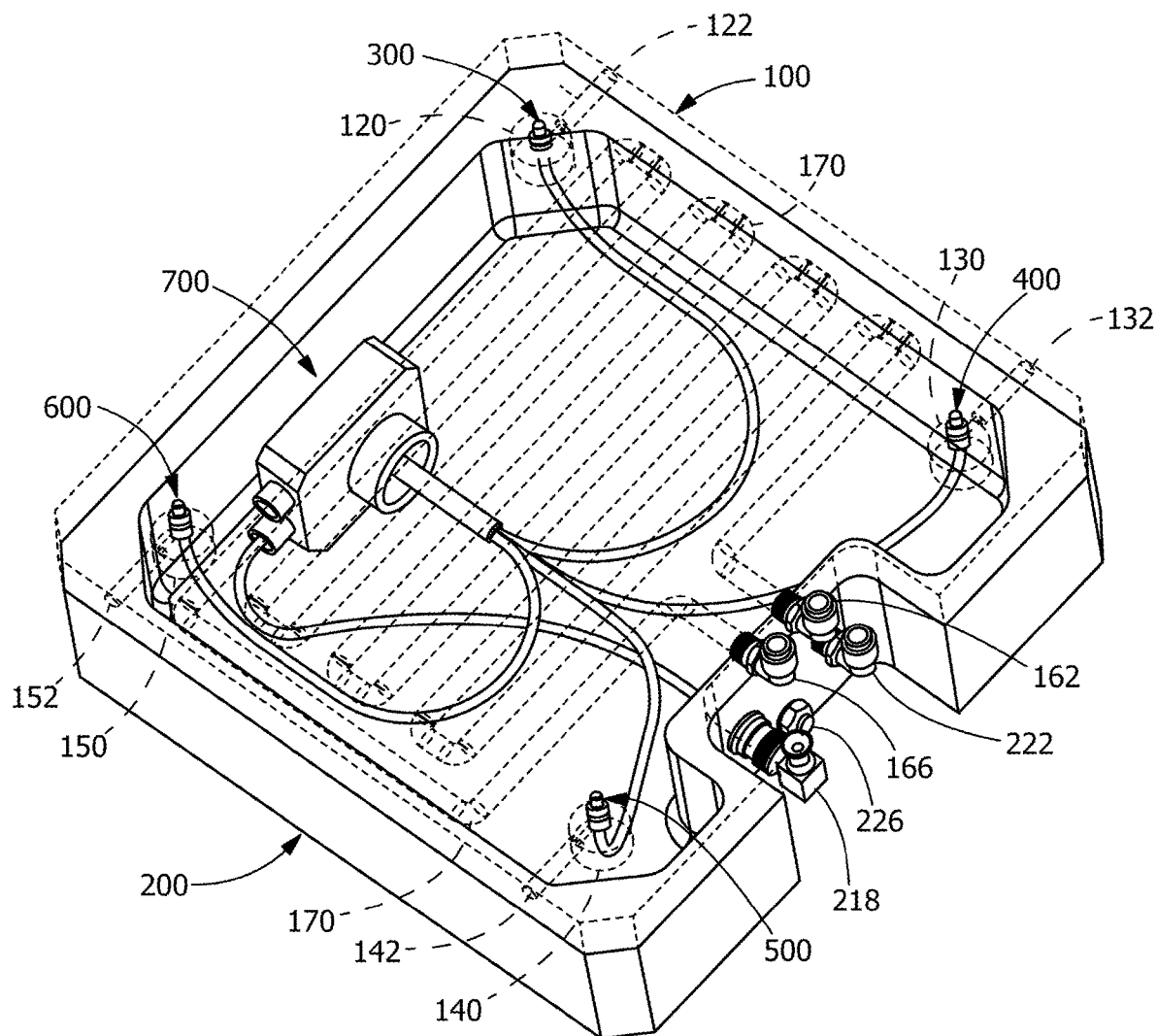
FIG. 2 is a perspective view of the testing apparatus of FIG. 1, wherein the calibration plate/support component and the cooling channels formed therein are shown in broken lines.
Figure 3:
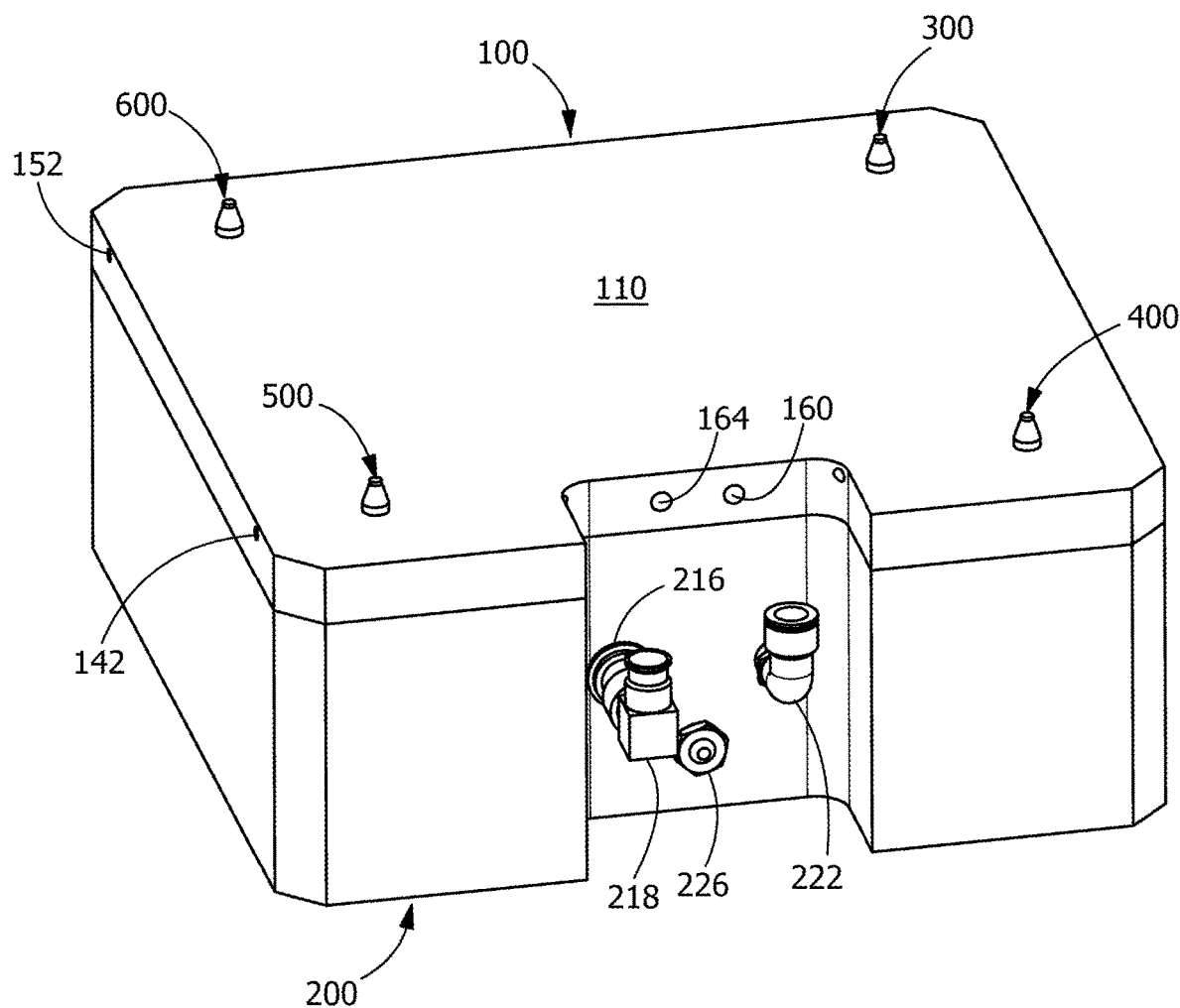
FIG. 3 is a perspective view of the testing apparatus of FIG. 1, wherein the calibration plate/support in which the pin-hole defining structures are mounted is shown in solid lines.
Figure 4:
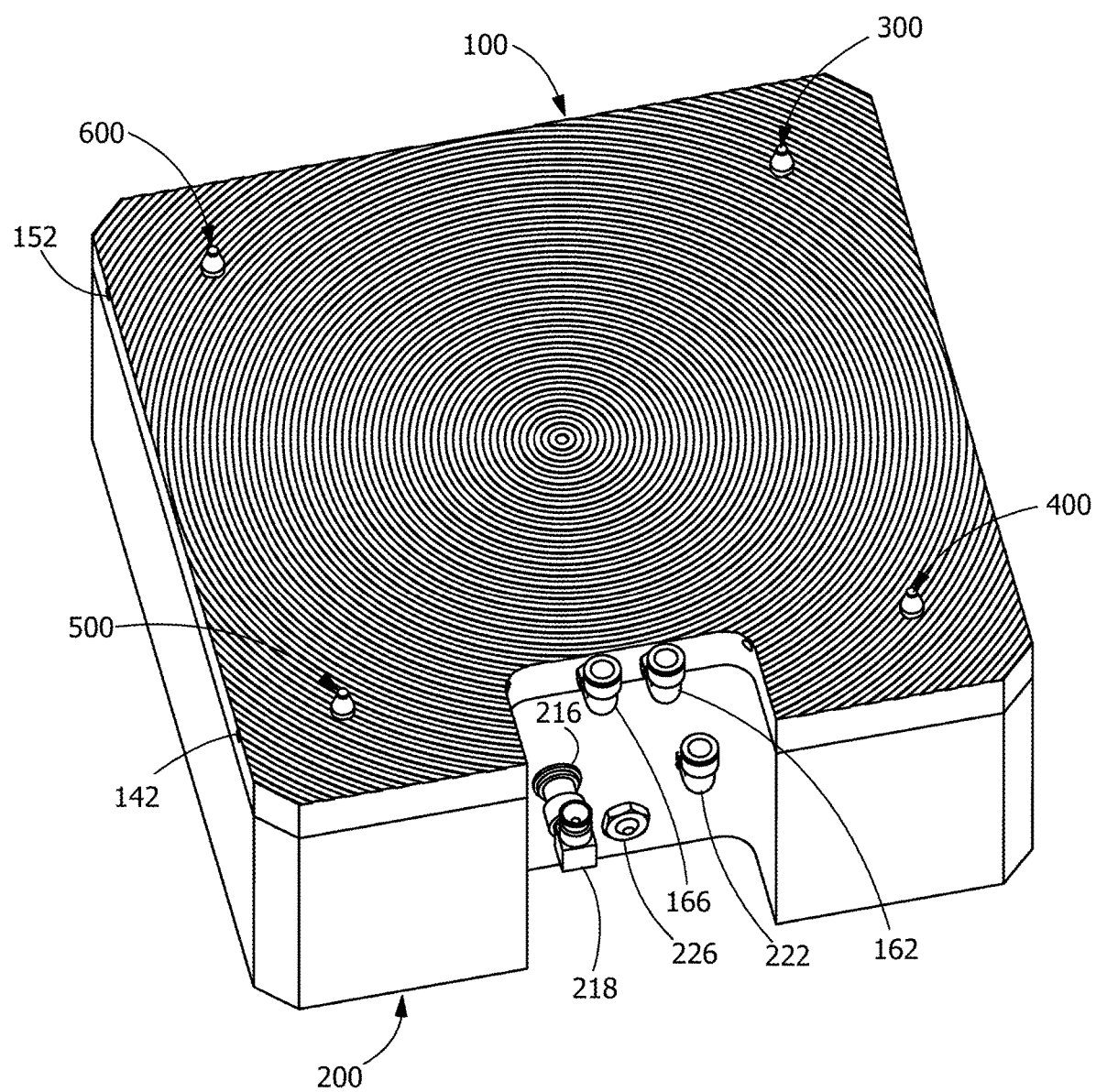
FIG. 4 is a perspective view of the testing apparatus of FIG. 1, wherein the upper surface of the calibration plate/support component includes a plurality of concentrically arranged ridges or raised portions for absorbing and distributing heat generated by a laser beam.
Figure 5C:
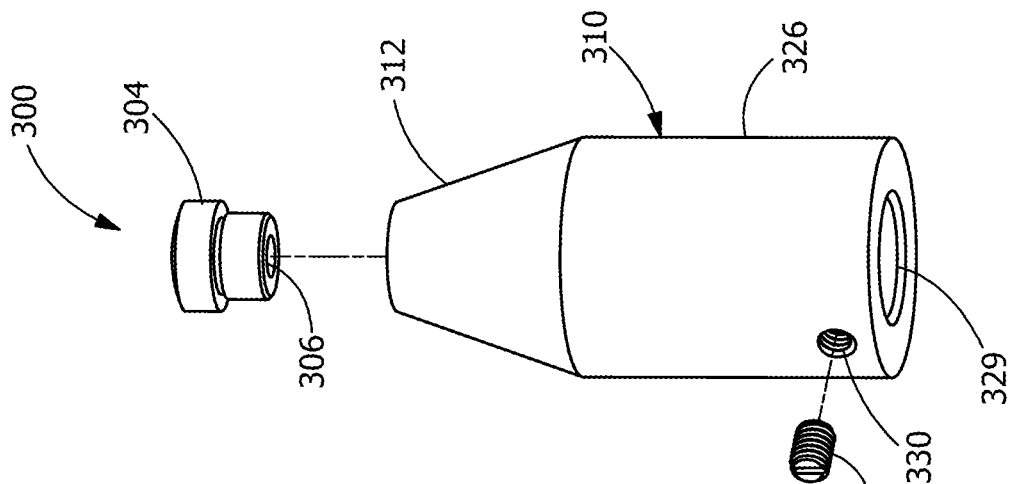
FIG. 5C is an exploded perspective view of the pin-hole defining structure (pedestal) of FIG. 5A.
Figure 5B:
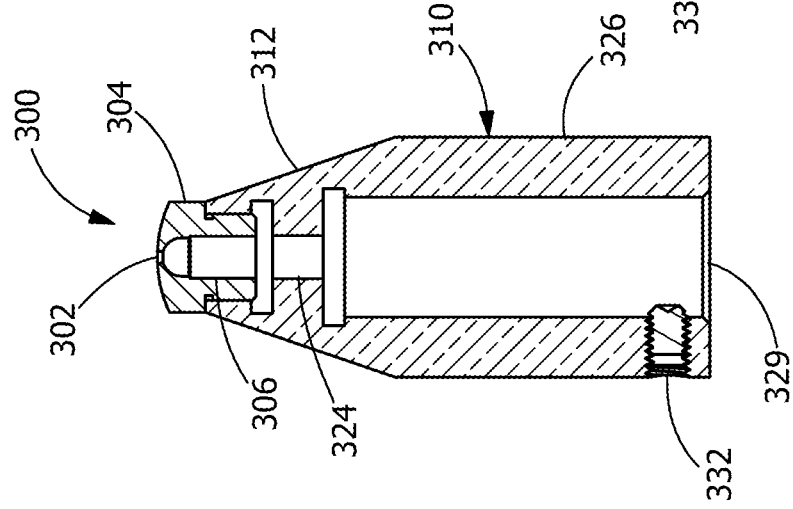
FIG. 5B is a cross-sectional view of the pin-hole defining structure (pedestal) of FIG. 5A.
Figure 5A:
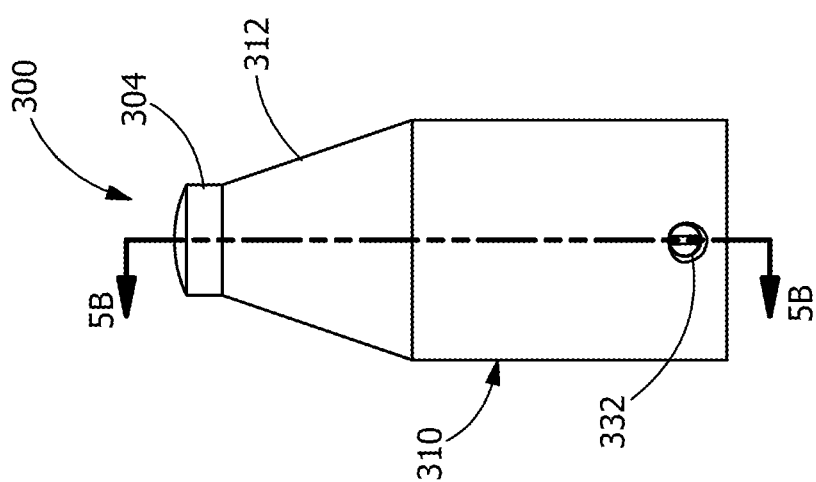
FIG. 5A is a front view of an example pin-hole defining structure (pedestal) shown in an assembled state.
Figure 6B:
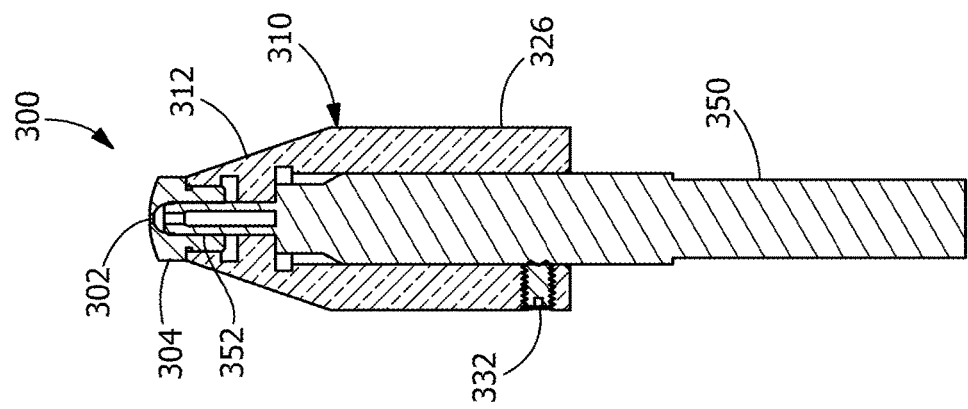
FIG. 6B is a cross-sectional view of the pin-hole defining structure (pedestal) and fiber optic cable assembly shown in FIG. 6A.
Figure 6A:
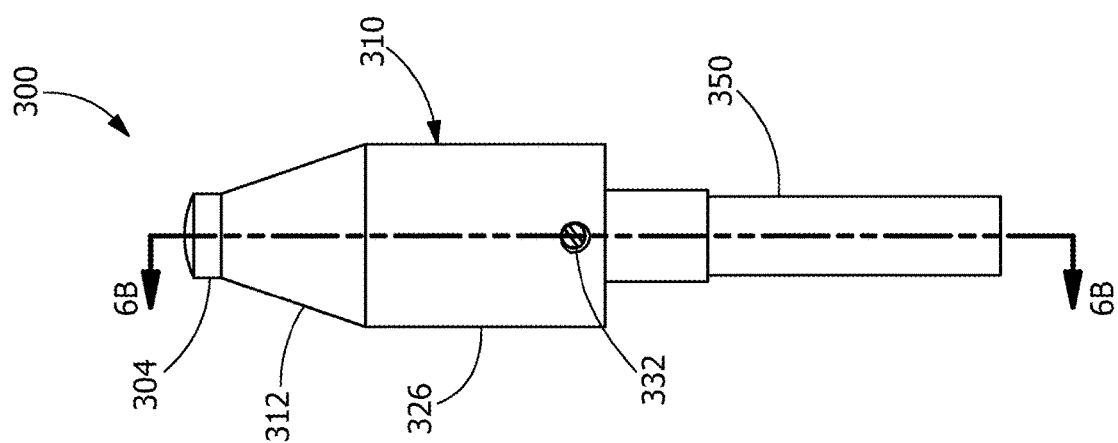
FIG. 6A is a front view of an example pin-hole defining structure (pedestal), wherein a fiber optic cable has been inserted into the pin-hole defining structure (pedestal)

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

U.S. Pat. Nos. 10,976,219; and 10,627,311 are relevant to the disclosed technology and the entire contents of each of these patents is expressly incorporated by reference herein and are made part of this patent application for all purposes. These references disclose a system for use in additive manufacturing, for example, which is an industrial process that adds successive superfine layers of material to create three-dimensional objects. Each successive layer bonds or is fused to a preceding layer of melted or partially melted material and different substances for layering material, including metal powder, thermoplastics, ceramics, composites, glass, and other materials. Laser Powder Bed Fusion (L-PBF) is a specific process used in additive manufacturing wherein a three-dimensional component or part is built using a layer-by-layer approach that utilizes a high-power laser. L-PBF typically involves: (i) spreading a layer of powdered material (e.g., metal) over a build platform or plate; (ii) using a laser to fuse the first layer or first cross-section of a part; (iii) spreading a new layer of powder across the previous layer using a roller, recoater arm, coating blade, or similar device; (iv) using the laser to fuse the new layer or new cross-section of the part; (v) adding and fusing successive layers or cross sections; (vi) repeating the process until the entire part is created. Loose, unfused powdered material remains in position, but is removed during post processing.

The functional success of L-PBF systems depends on the existence of a known and stable laser focal spot on the powder bed work plane. The technology disclosed in U.S. Pat. Nos. 10,976,219; and 10,627,311 provides a portable testing apparatus for analyzing the quality and dynamic accuracy of laser focal spots in various L-PBF systems and devices. This testing apparatus is used with a laser powder bed fusion additive manufacturing device that further includes at least one laser that generates a non-stationary laser beam having known or predetermined characteristics and a build plane positioned at a predetermined location relative to the non-stationary laser beam, wherein the non-stationary laser beam translates (i.e., traverses) across the build plane in a controlled manner during additive manufacturing processes. The apparatus includes a support having an upper surface adapted to receive and absorb laser light generated by the non-stationary laser beam; a plurality of pin-hole defining structures each positioned to receive the laser light generated by the non-stationary laser beam, and such that each pin-hole is elevated at a predetermined height above the upper surface of the support and parallel thereto; a fiber optic cable disposed within each pin-hole defining structure, wherein each fiber optic cable has a proximal end at which the laser light is received through the pin-hole and a distal end to which the laser light is delivered; and a photodetector located at the distal end of each fiber optic cable, wherein the photodetector converts the laser light delivered to the photodetector into electrical voltage output signals based on intensity of the laser light received through each pin-hole. FIGS. 1-4, 5A-C, 6A-6B, 7A-F, and 8A-C provide various illustrative views of an example testing apparatus for analyzing the quality and dynamic accuracy of laser focal spots in various laser-based manufacturing systems including L-PBF systems and laser beam welding (LBW) systems.

As best shown in FIGS. 1-4, example testing apparatus 10 includes support 100; base 200; pin-hole defining structures or pin-hole sensors 300, 400, 500, and 600, which are mounted in support 100; and photodetector 700, which is located in base 200. Support 100, which is roughly square in shape, and which may be referred to as a calibration plate, includes an absorptive upper surface 110, which may further include a series of concentrically arranged ridges or other raised structures (see FIG. 4) that absorb and distribute heat generated by the laser beam for preventing damage to upper surface 110 and support 100. Support 100 further includes first mounting recess 120 (for receiving first pin-hole defining structure 300), first set screw aperture 122 (for receiving a set screw that secures first pin-hole defining structure 300 within first mounting recess 120), second mounting recess 130 (for receiving second pin-hole defining structure 400), second set screw aperture 132 (for receiving a set screw that secures second pin-hole defining structure 400 within second mounting recess 130), third mounting recess 140 (for receiving third pin-hole defining structure 500), third set screw aperture 142 (for receiving a set screw that secures third pin-hole defining structure 500 within third mounting recess 140, fourth mounting recess 150 (for receiving fourth pin-hole defining structure 600), and fourth set screw aperture 152 (for receiving a set screw that secures fourth pin-hole defining structure 600 within fourth mounting recess 150). Support 100 also includes first aperture 160 for receiving first coolant fitting 162, second aperture 164 for receiving second coolant fitting 166 and channels 170 for receiving and transporting liquid or gas coolant that transfers energy absorbed by support 100 away from testing apparatus 10.

Also, as best shown in FIGS. 1-4, base 200, the shape of which corresponds to the shape of support 100, cooperates with support 100 to form an enclosure. Base 200 includes outer wall 210 and inner cavity 212 in which photodetector 700 and the various fiber optic cables attached to the pin-hole defining structures are placed. Base 200 also includes aperture 214 for receiving Bayonet Neill-Concelman (BNC) bulkhead 216 to which BNC connector 218 is attached, second aperture 220 for receiving gas fitting 222, and third aperture 224 for receiving gas relief valve 226. In certain implementations, a source of pressurized gas is connected to gas fitting 222 for delivering outwardly flowing gas to and through each pin-hole for preventing the contamination thereof by debris generated during the testing process or other debris.

With reference to FIGS. 1-4, 5A-C, and 6A-6B, the example implementation of testing apparatus 10 shown in the Figures includes four pin-hole defining structures, which are also referred to as "pedestals". FIGS. 5A-C and 6A-6B illustrate only first pin-hole defining structure 300; however, the remaining pin-hole defining structures (400, 500, and 600) are constructed in the same manner as first pin-hole defining structure 300. Accordingly, FIGS. 5A-C and 6A-6B are meant to be representative of all of the pin-hole defining structures depicted in the Figures.

As shown in FIGS. 5A-C and 6A-6B, first pin-hole defining structure or pedestal 300 includes first pin-hole 302, which is formed in tip 304 through which channel 306 passes. The diameter of pin-hole 302 is typically one third to one-thirtieth the diameter of the laser beam being characterized by testing apparatus 10 (e.g., pinhole diameter: 5-50 µm). Tip 304 typically includes a highly reflective material such as gold, copper, or other reflective metal for minimizing damage to the pin-hole and pin-hole defining structure caused by absorption of energy from the laser beam. Tip 304 is mounted within body 310 which includes tapered portion 312 and cylindrical portion 326 through which channel 328 passes. First set screw aperture 330 is adapted to receive first set screw 332 which secures first fiber optic cable 350 in body 310. First optical fiber 352 is inserted into channel 306 and brought into close proximity with first pin-hole 302. First pin-hole defining structure or pedestal 300 is mounted within support 100 such that the pin-hole is elevated above upper surface 110 at a height (e.g. 20 to 40 mm) that minimizes any damage to the pin-hole and pedestal that may be caused by the energy of the non-stationary laser beam.

FIGS. 7A-7F are illustrations of testing apparatus 10 being used to analyze the characteristics of a non-stationary laser beam generated by a laser source present in a laser powder bed fusion system being used for additive manufacturing. In these Figures, laser source or laser 800 generates laser beam 802, which contacts upper surface 110 of testing apparatus 10 at multiple positions or locations, including locations that include the previous discussed pin-holes. During the normal operation of testing apparatus 10, laser beam 802 is continually manipulated at typical operating power for bringing all the laser beam delivery elements of the laser powder bed fusion machine or system up to normal operating temperature and functionality such that any misalignment of laser beam 802 or loss of laser focus quality may be detected.

Figure 8A:
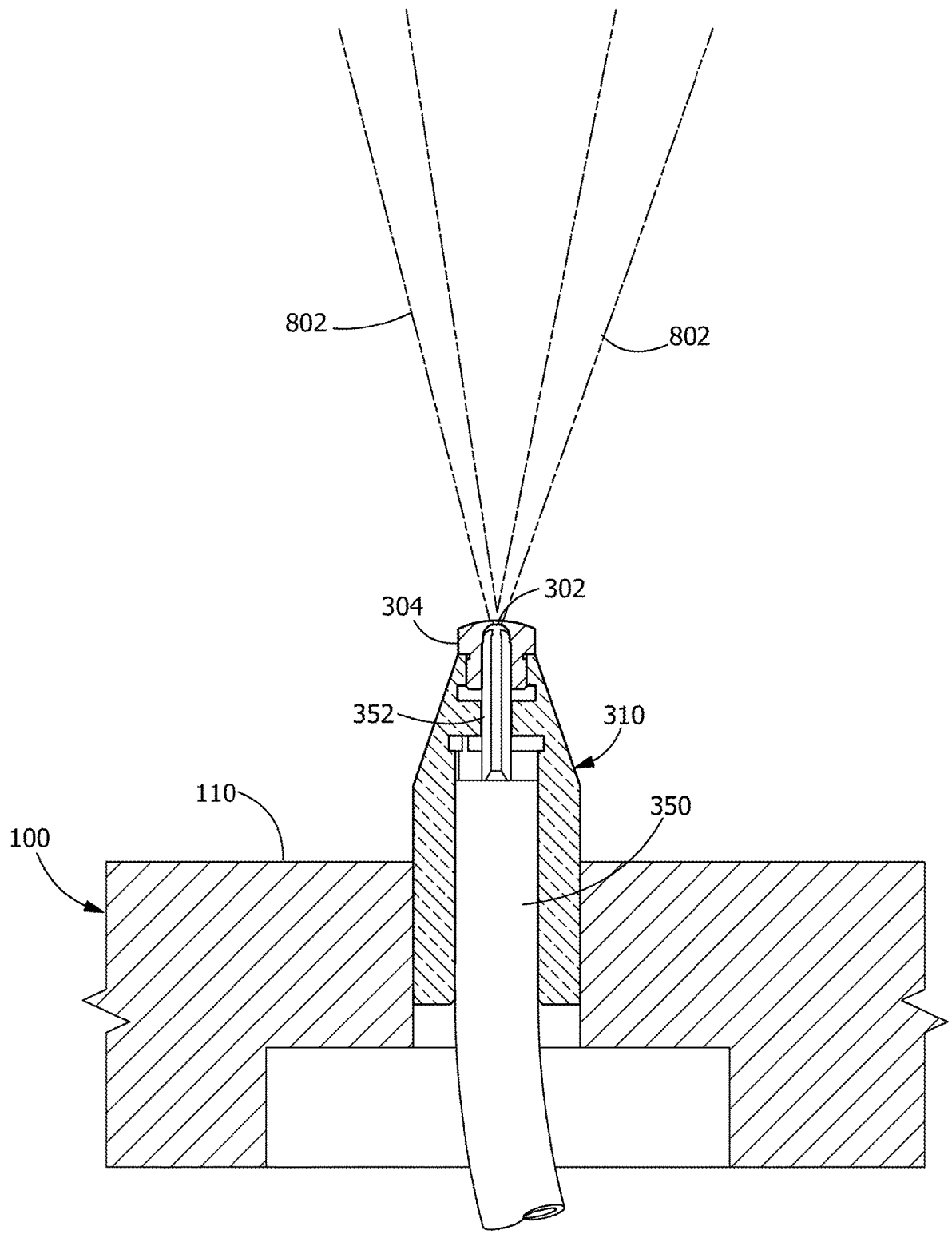
FIG. 8A is a cross-sectional view of an example pin-hole defining structure shown mounted in the calibration plate/support and receiving laser light from a laser beam being analyzed by the testing apparatus.
Figure 8B:
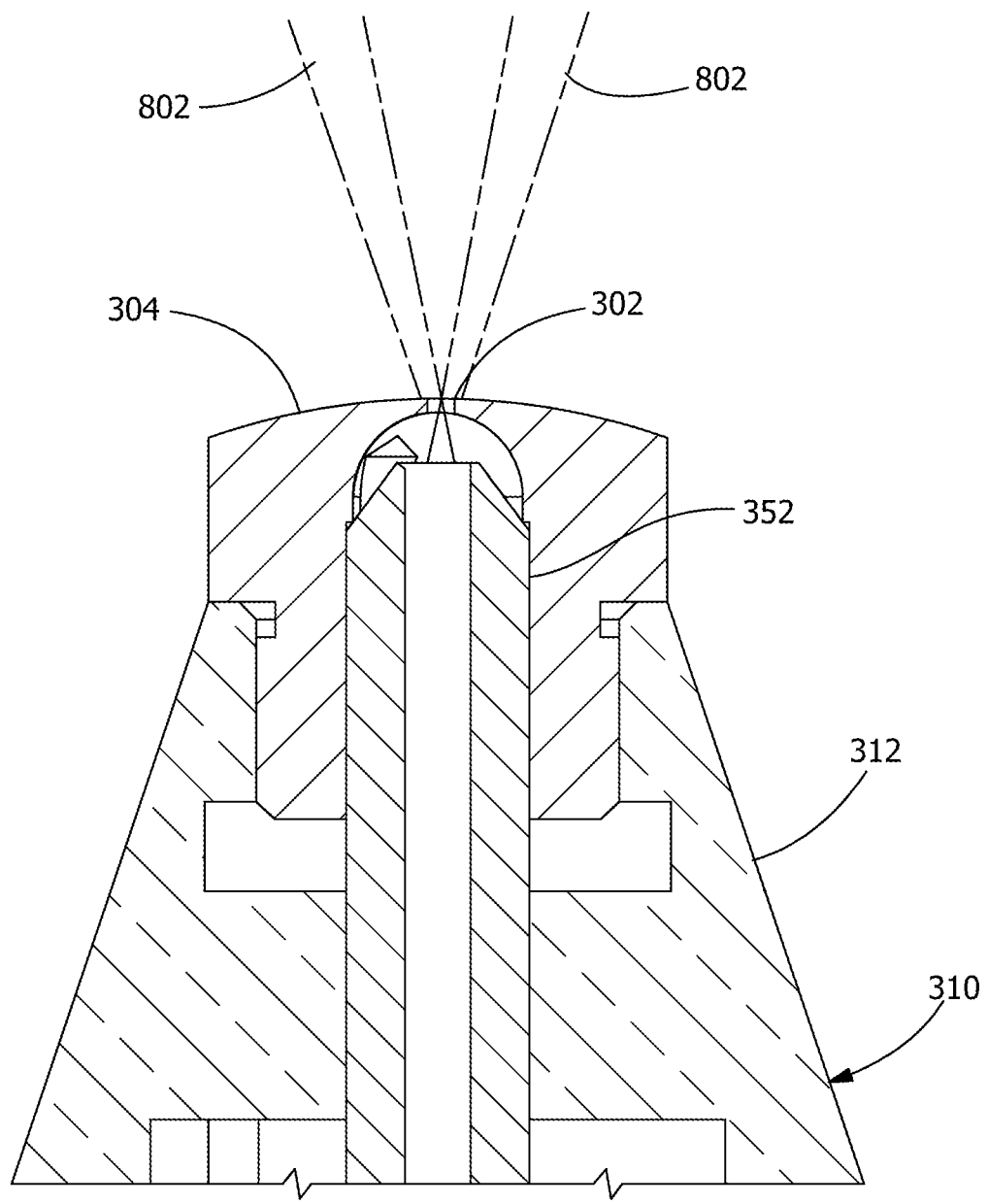
FIG. 8B is a detail of the upper portion of FIG. 8A showing a portion of the laser light passing through a pin-hole and the remaining laser light being reflected by the pin-hole defining structure.
Figure 8C:
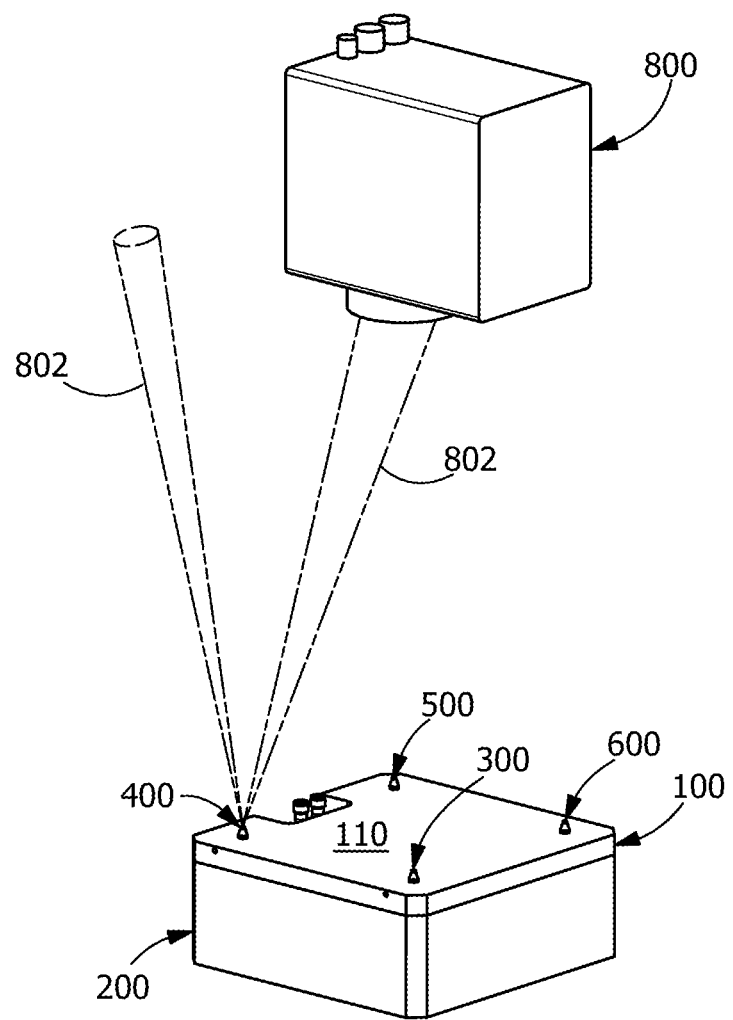
FIG. 8C is an illustration of an example testing apparatus being used to analyze the characteristics of a non-stationary laser beam being generated by a laser source present in a laser powder bed fusion system, wherein the laser beam is shown reflecting from one of the pin-hole defining structures.

FIG. 8A provides a cross-sectional view of pin-hole defining structure 300 shown mounted in support 100 and receiving laser light from laser beam 802 during normal operation of a laser powder bed fusion system being analyzed. FIG. 8B is a detail of the upper portion of FIG. 8A showing the laser light being reflected by pin-hole defining structure 300; and FIG. 8C provides an illustration of testing apparatus 10 being used to analyze the characteristics of non-stationary laser beam 802 being generated by laser source 800, wherein laser beam 802 is shown reflecting from pin-hole defining structure 400. In FIGS. 8A-8B, light from laser beam 802 is shown passing through pin-hole 302 and entering optical fiber 352 through which the signal is transmitted to photodetector 700 (see FIG. 1). The laser light than passes through pin-hole 302 is only a small amount of the laser light generated by laser beam 802. For example, for a laser beam having a total diameter of about 0.1 mm, the diameter of the portion of the beam that passes though pin-hole 302 would be about 0.025 mm. Laser light collected from each pin-hole may be transmitted to one or more light measuring devices through fiber optic coupling. Testing apparatus 10 includes a data acquisition device in communication with photodetector 700, wherein the data acquisition device receives, saves, organizes, and analyzes electrical signals as a function of time, or time and position, relative to the pin-holes through which the laser light was received. A data analysis algorithm associated with the data acquisition device calculates and determines laser beam quality based on data acquired from multiple passes of the non-stationary laser beam over the plurality of pin-holes. The data acquisition device may also include hardware and/or software (e.g., blue tooth or the like) that enables the transmission of data to a receiver located outside of an additive manufacturing device.

The systems, devices, and methods described above, and in U.S. Patent Publication No. 2021/0223140, which is also incorporated by reference herein in its entirety, are useful for analyzing many aspects of high-speed laser motion systems. In one implementation, the disclosed technology is used in a method for analyzing a laser beam while in-motion (as the laser beam would be in-use) at the extremities of a field of view or anywhere within a field of view for a particular high-speed laser system. These extremes or off-center areas of the laser system field of view are where laser beam abnormalities typically occur, as do expected changes in laser beam characteristics that are documented and accounted for in determining proper process parameters. Moving a laser beam across a pinhole permits more realistic measurements because the laser beam is in motion, as it would be in-process, utilizing and heating all portions of a lens included as a focusing optic.

Laser powder bead fusion machine operators and remote laser welding system operators performing processes that require a laser beam to be in motion during processing are required to understand system characteristics while the laser is actually in motion. When a laser beam is in motion, (e.g., Galvo Scanner Systems), the laser beam focal spot can be affected by the focusing optic in use, e.g., telecentric lens or f-theta lens, resulting in some distortion of the focal spot away from the center of the field of view. The ability to capture laser beam characteristics in a state of motion, is a primary advantage of the disclosed system, the design and form of which allows the system to be placed at the extremities of the field of view for in-motion analysis in areas or regions that are difficult to analyze. Prior art systems are stationary beam only in nature, and measurements can only be carried out at or near the center of the field of view, which does not detect or indicate changes in the laser beam at extreme locations, which is problematic and limiting because beam ovality, focus changes, and other abnormalities occur as the laser beam moves away from the straight down center of the field of view.

Key aspects and advantages of the disclosed technology include: (i) evaluation near the extremities of the field of view and evaluation at the center of the field of view using the same apparatus; (ii) evaluation of a laser beam while in motion as it is during the actual the build/welding process; and (iii) evaluation data derived away from center can be used to compensate process parameters for more consistent laser processing access the field of view. Prior art systems including Primes Scan Field Monitor and Ophir Beam Watch AM are limited in sampling capability and location (or are incapable thereof). These systems have limited capability to sample the beam in motion, as it would be used in-process, and these systems have no current capability to sample the beam in motion at processing speeds. Numerous business entities are original equipment manufacturers, users, customizers, and analyzers of laser processing systems, including laser powder bed fusion systems and remote laser welding systems. Commercially available analytical systems are not sufficient for analyzing laser processing systems due to design limitations that require stationary beams and because large analytical systems limit the field of view areas that can be analyzed. Additionally, industry standards such as AMS 7003 create demand for a system such as the disclosed technology, which does not suffer from the design limitations of existing systems.

Figure 9A:
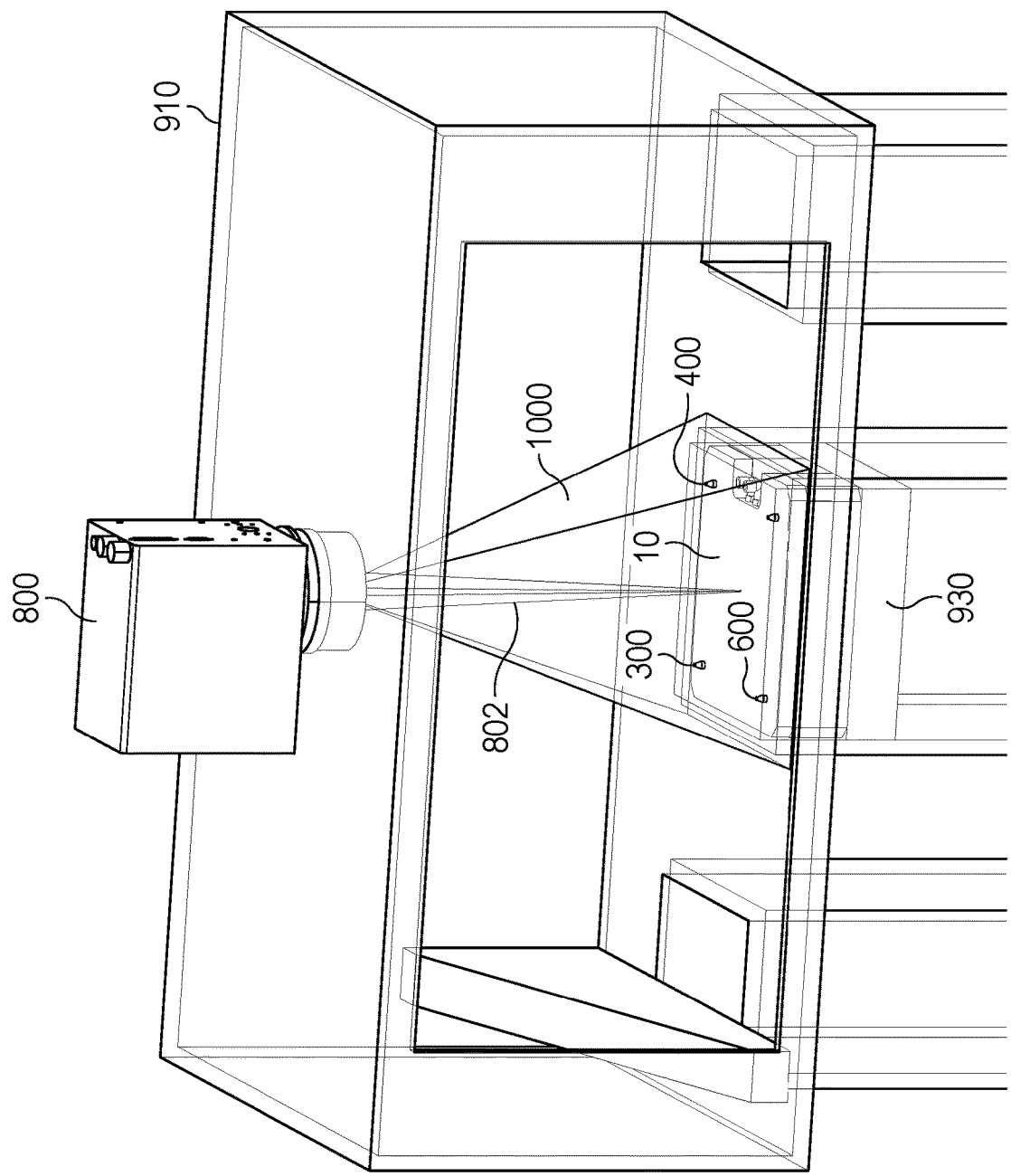
Figure 9B:
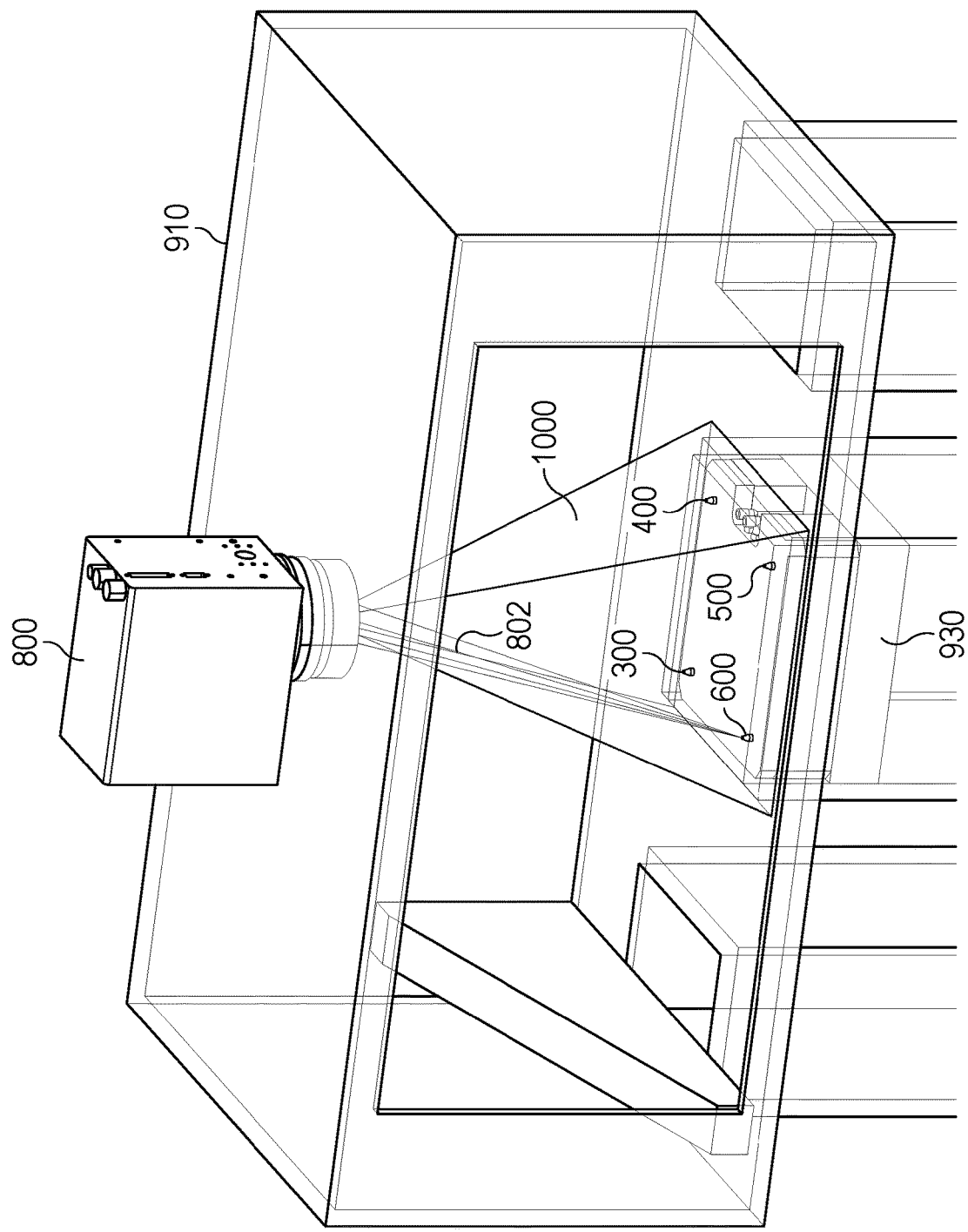
Figure 9C:
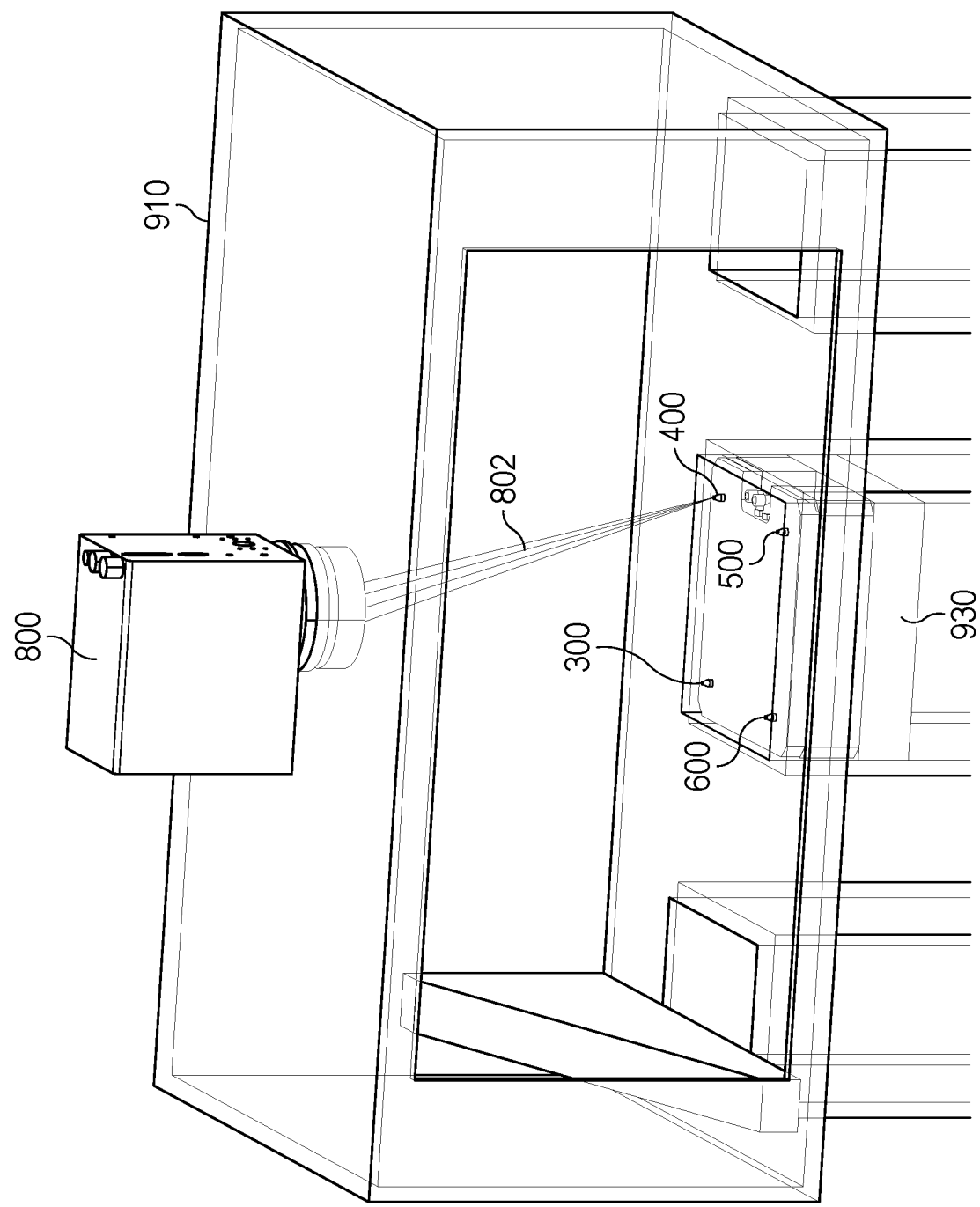
FIG. 9C depicts analyzing laser beam characteristics at another pin-hole sensor located away from the center of the field of view of the laser.

With reference to FIGS. 9A-9C, example testing apparatus 10 having pin-hole sensors 300, 400, 500, 600 is placed on build platform 930 within enclosure 910. Testing apparatus 10 is placed on build platform 930 such that pin-hole sensors 300, 400, 500, 600 are located within field of view 1000 created by laser 800. Pin-hole sensors 300, 400, 500, 600 are positioned at the extremities of field of view 1000. As shown in FIG. 9A, laser 800 generates non-stationary laser beam 802 to a center location within field of view 1000. Non-stationary laser beam 802 has measurable characteristics that are known or determined at the center location of field of view 1000. Measurable characters of non-stationary laser beam 802 include spot size, shape, and irradiance within the spot size. As shown in FIG. 9B, non-stationary laser beam 802 is directed to pin-hole sensor 600 at an extremity in field of view 1000, and pin-hole sensor 600 measures the characteristics of non-stationary laser beam 802, including spot size, shape, and irradiance within the spot size. As shown in FIG. 9C, non-stationary laser beam 802 is directed to pin-hole sensor 400 located at another extremity of field of view 1000, wherein pin-hole sensor 400 measures the characteristics of non-stationary laser beam 802. Non-stationary laser beam 802 can be directed to any of pin-hole sensors 300, 400, 500, 600 to determine the characteristics of non-stationary laser beam 802 at their respective location. Differences between laser beam characteristics at the center location in field of view 1000 and at the extremities in field of view 1000 are captured and accounted for during processing.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

Specific details are given in the above description to provide a thorough understanding of the disclosed technology. However, it is understood that the disclosed embodiments and implementations can be practiced without these specific details. For example, circuits can be shown in block diagrams in order not to obscure the disclosed implementations in unnecessary detail. In other instances, well-known circuits, processes, algorithms, structures, and techniques can be shown without unnecessary detail in order to avoid obscuring the disclosed implementations.

Implementation of the techniques, blocks, steps and means described above can be accomplished in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

The disclosed technology can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, the disclosed technology can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A system for analyzing laser beam characteristics at field of view extremities or other selected locations in high-speed laser motion systems, wherein the high-speed laser motion systems comprise a laser that generates a non-stationary laser beam and a build platform positioned at a predetermined location relative to the non-stationary laser beam, comprising:
   (a) a known or pre-defined field of view of the laser, wherein the laser beam characteristics are known or determined at a center location of the field of view; and
   (b) a plurality of pin-hole sensors mounted at the field of view extremities such that each pin-hole sensor is positioned to receive the laser light generated by the non-stationary laser beam,
      (i) wherein each pin-hole sensor measures the laser beam characteristics at the field of view extremities, and
      (ii) wherein differences between the laser beam characteristics at the center location and the laser beam characteristics at the field of view extremities are captured and accounted for in the high-speed laser motion system during processing, and wherein one or more adjustments in processing are made based on the differences.

2. The system of claim 1, wherein the system further comprises a portable testing apparatus, wherein the portable testing apparatus includes a support having an upper surface, wherein the upper surface is positioned parallel to and above the build platform of the high-speed laser motion systems, and wherein the upper surface is adapted to receive and absorb laser light generated by the laser beam.

3. The system of claim 2, wherein the plurality of pin-hole sensors are mounted at the field of view extremities in the support.

4. The system of claim 2, wherein the system further comprises a fiber optic cable coupled to each pin-hole sensor, wherein each fiber optic cable has a proximal end at which the laser light is received through the pinhole sensor and a distal end to which the laser light is delivered.

5. The system of claim 4, wherein the system further comprises a photodetector located at the distal end of each fiber optic cable, wherein the photodetector converts the laser light delivered to the photodetector into electrical voltage output signals based on intensity of the laser light received through each pin-hole sensor.

6. The system of claim 1, wherein the laser beam characteristics measured include spot size, shape, and irradiance within the spot size.

7. The system of claim 1, a calibration plate is used to pre-define the field of view of the laser.

8. A system for analyzing laser beam characteristics at field of view extremities or other selected locations in high-speed laser motion systems, wherein the high-speed laser motion systems comprise a laser that generates a laser beam and a build platform positioned at a predetermined location relative to the laser beam, comprising:
    (a) a portable testing apparatus, wherein the portable testing apparatus includes a support having an upper surface, wherein the upper surface is positioned parallel to and above the build platform of the high-speed laser motion systems, and wherein the upper surface is adapted to receive and absorb laser light generated by the laser beam;
    (b) a known or pre-defined field of view of the laser, wherein the laser beam characteristics are known or determined at a center location of the field of view, and wherein the laser beam characteristics include spot size, shape, and irradiance within the spot size; and
    (c) a plurality of pin-hole sensors mounted at the field of view extremities in the support such that each pin-hole sensor is positioned to receive the laser light generated by the laser beam,
        (i) wherein each pin-hole sensor measures the laser beam characteristics at the field of view extremities, and
        (ii) wherein differences between the laser beam characteristics at the center location and the laser beam characteristics at the field of view extremities are captured and accounted for in the high-speed laser motion system during processing, and wherein one or more adjustments in processing are made based on the differences.

9. The system of claim 8, wherein the system further comprises a fiber optic cable coupled to each pin-hole sensor, wherein each fiber optic cable has a proximal end at which the laser light is received through the pinhole sensor and a distal end to which the laser light is delivered.

10. The system of claim 9, wherein the system further comprises a photodetector located at the distal end of each fiber optic cable, wherein the photodetector converts the laser light delivered to the photodetector into electrical voltage output signals based on intensity of the laser light received through each pin-hole sensor.

11. The system of claim 8, a calibration plate is used to pre-define the field of view of the laser.

12. A method for analyzing laser beam characteristics at field of view extremities or other selected locations in high-speed laser motion systems, wherein the high-speed laser motion systems comprise a laser that generates a non-stationary laser beam and a build platform positioned at a predetermined location relative to the non-stationary laser beam, comprising:
    (a) defining a field of view of the laser;
    (b) mounting a plurality of pin-hole sensors at the field of view extremities such that each pin-hole sensor is positioned to receive the laser light generated by the non-stationary laser beam;
    (c) through each pin-hole sensor, measuring the laser beam characteristics at the field of view extremities;
    (d) capturing and accounting for differences between the laser beam characteristics at the field of view extremities and the laser beam characteristics at a known or determined center location of the field of view during processing; and
    (e) making one or more adjustments in processing based on the differences.

13. The method of claim 12, further comprising coupling a fiber optic cable to each pin-hole sensor, wherein each fiber optic cable has a proximal end at which the laser light is received through the pinhole sensor and a distal end to which the laser light is delivered.

14. The method of claim 13, further comprising positioning a photodetector at the distal end of each fiber optic cable, wherein the photodetector converts the laser light delivered to the photodetector into electrical voltage output signals based on intensity of the laser light received through each pin-hole sensor.

15. The method of claim 12, wherein the laser beam characteristics measured include spot size, shape, and irradiance within the spot size.

16. The method of claim 12, wherein a calibration plate is used to define the field of view of the laser.

* * * * *